Patented Oct. 11, 1938

2,132,869

UNITED STATES PATENT OFFICE 2,132,869

CELLULOSE ACETATE LACQUERS CONTAINING OXIDIZED CELLULOSE ACETATE

Charles R. Fordyce and Martti Salo, Rochester, N. Y., assignors to Eastman Kodak Company, Rochester, N. Y., a corporation of New Jersey No Drawing. Application December 15, 1936, Serial No. 115,971

2 Claims. (Cl. 134—79)

This invention relates to cellulose acetate lacquers, and has as its object to provide a cellulose acetate lacquer which will adhere firmly to metal and other surfaces which it is desired to coat.

The use of cellulose acetate in lacquers has been greatly restricted by the insufficient adhesion of cellulose acetate lacquer films to surfaces to which they are applied. In the case of cellulose nitrate lacquers, adhesion can be improved by the incorporation of resins in the lacquer. Very few resins, however, are compatible with cellulose acetate, and even those which are compatible do not always confer the property of good adhesion on cellulose acetate lacquers in which they are incorporated.

We have discovered that the adhesion of cellulose acetate lacquers to metal and other surfaces can be improved by the incorporation of oxidized cellulose acetate in the cellulose acetate lacquer.

The method by which we prefer to prepare oxidized cellulose acetate is as follows: A suspension of 100 parts of cellulose acetate of 38% acetyl content in a solution of 10 parts of potassium permanganate, 13.5 parts of sulfuric acid, and 1500 parts of distilled water is held at 25° C. until the permanganate color has entirely disappeared, which requires approximately three hours. The suspended, oxidized cellulose acetate is then treated with water containing sulfur dioxide to remove the manganese dioxide adhering to it, and finally is washed with distilled water and dried.

The preparation of oxidized cellulose acetate is described in U. S. Patent 1,976,758 of George B. Watkins and Joseph D. Ryan, which shows its use as an adhesive layer between cellulose acetate sheeting and glass sheeting in the manufacture of safety glass. Oxidized cellulose acetate, however, is too water-absorbent and the films it forms are too brittle to permit of its use as the sole film forming component of a lacquer which is to form the surface layer of an object.

We have found that oxidized cellulose acetate is compatible in all proportions with cellulose acetate, and that lacquers made from mixtures, in suitable porportions, of cellulose acetate, oxidized cellulose acetate, and a plasticizer, are very satisfactory with respect to adhesion, flexibility and water resistance.

As an illustration of the effect of an admixture of oxidized cellulose acetate on the adhesion of cellulose acetate, we give the following examples:

*Example I.*—10 parts by weight of low-viscosity cellulose acetate of 40% acetyl content and 2 parts by weight of oxidized cellulose acetate prepared by our preferred method, were dissolved in 10 parts by weight of a solvent mixture composed of

| | Per cent by weight |
|---|---|
| Acetone | 50 |
| Ethylene glycol monomethyl ether acetate | 20 |
| Toluene | 15 |
| Methyl acetate | 15 | and the solution was coated on a strip of cold rolled steel. Stripping tests were carried out by the Gardner Laboratory adhesion method, described on page 217 of the 6th edition of "Physical and Chemical Examination of Paints, Varnishes, Lacquers and Colors", by H. A. Gardner. A stripping load of over 600 grams was necessary to remove the film from the metal, as compared to a load of only 50 grams necessary to remove a film of a cellulose acetate lacquer made in the same way except for the omission of the oxidized cellulose acetate. The load required for stripping the cellulose acetate lacquer containing oxidized cellulose acetate was approximately the same as that required for stripping a typical, commercial cellulose nitrate lacquer.

The ratio of the weight of oxidized cellulose acetate to cellulose acetate in a lacquer may range from 1:4 to 3:1. Proportions much less than 1:4 do not give satisfactory adhesion, while proportions much greater than 3:1 do not give satisfactory flexibility or stability upon aging. In most cases, it is desirable to use a cellulose acetate plasticizer in the lacquer. The lower alkyl phthalates, such as dimethyl, diethyl and dibutyl phthalates are very satisfactory, as are tripropionin, tributyl phosphate, and dibutyl tartrate. The quantity of plasticizer may vary widely, but best results are obtained if the weight of plasticizer is from 40% to 60% of the combined weight of cellulose acetate and oxidized cellulose acetate.

In lacquer compositions to be applied by spraying, solvent combinations already known for use with cellulose acetate may be employed. We have found the following mixtures very satisfactory:

| | Per cent by weight |
|---|---|
| (A) Acetone | 50 |
| Ethylene glycol monomethyl ether | 20 |
| Methyl acetate | 15 |
| Toluene | 15 |
| (B) Acetone | 50 |
| Ethyl lactate | 20 |
| Ethyl acetate | 15 |
| Toluene | 15 |

The concentration of the lacquer solution will vary somewhat, depending upon the viscosity desired, but ordinarily the combined weight of cellulose acetate and oxidized cellulose acetate will be from 6% to 9% of the combined weight of cellulose acetate, oxidized cellulose acetate, and solvent mixture. Pigments may be incorporated if desired.

*Example II.*—400 parts of low-viscosity, acetone-soluble cellulose acetate and 400 parts of oxidized cellulose acetate were dissolved in a mixture of 5000 parts of acetone, 2000 parts of ethylene glycol monomethyl ether, 1500 parts of methyl acetate and 1500 parts of toluene. 400 parts of diethyl phthalate was then added as a plasticizer. All parts are expressed by weight. Panels of polished steel were coated by spraying this solution under standard spraying conditions. When thoroughly dry, the lacquer coatings were found to adhere very tenaciously to the metal.

For uses which require coating from heavy solutions, ordinary cellulose acetate solvents, such as acetone, ethylene chloride-methyl alcohol mixtures, methyl acetate, etc., may be employed without diluents, and the concentration of the solution adjusted to give the required viscosity.

*Example III.*—400 parts of oxidized cellulose acetate and 600 parts of low-viscosity cellulose acetate of high acetyl content were dissolved in a mixture of 2500 parts of ethylene chloride and 500 parts of ethyl alcohol. All parts are expressed by weight. By means of a suitable coating machine this solution was applied as a thin surface coating to paper. The resulting coated paper exhibited good appearance and firm adhesion of the applied coating to the paper.

What we claim as our invention and desire to be secured by Letters Patent of the United States is:

1. A cellulose acetate lacquer comprising oxidized cellulose acetate in the proportion of from 1 to 12 parts of oxidized cellulose acetate per 4 parts of cellulose acetate, the lacquer having the property of adhering firmly to metal and other surfaces to which it is applied, and of continuing to adhere when the lacquered surface is bent.

2. A flexible article of manufacture having a closely adhering coating of a cellulose acetate lacquer comprising oxidized cellulose acetate in the proportion of from 1 to 12 parts of oxidized cellulose acetate per 4 parts of cellulose acetate, the lacquer forming the surface layer of the finished article, and maintaining its adhesion to the article when the article is bent.

CHARLES R. FORDYCE.
MARTTI SALO.